Dec. 1, 1942.  O. H. SALLEE  2,303,583
SPREADER APPARATUS
Filed April 2, 1941  4 Sheets—Sheet 4
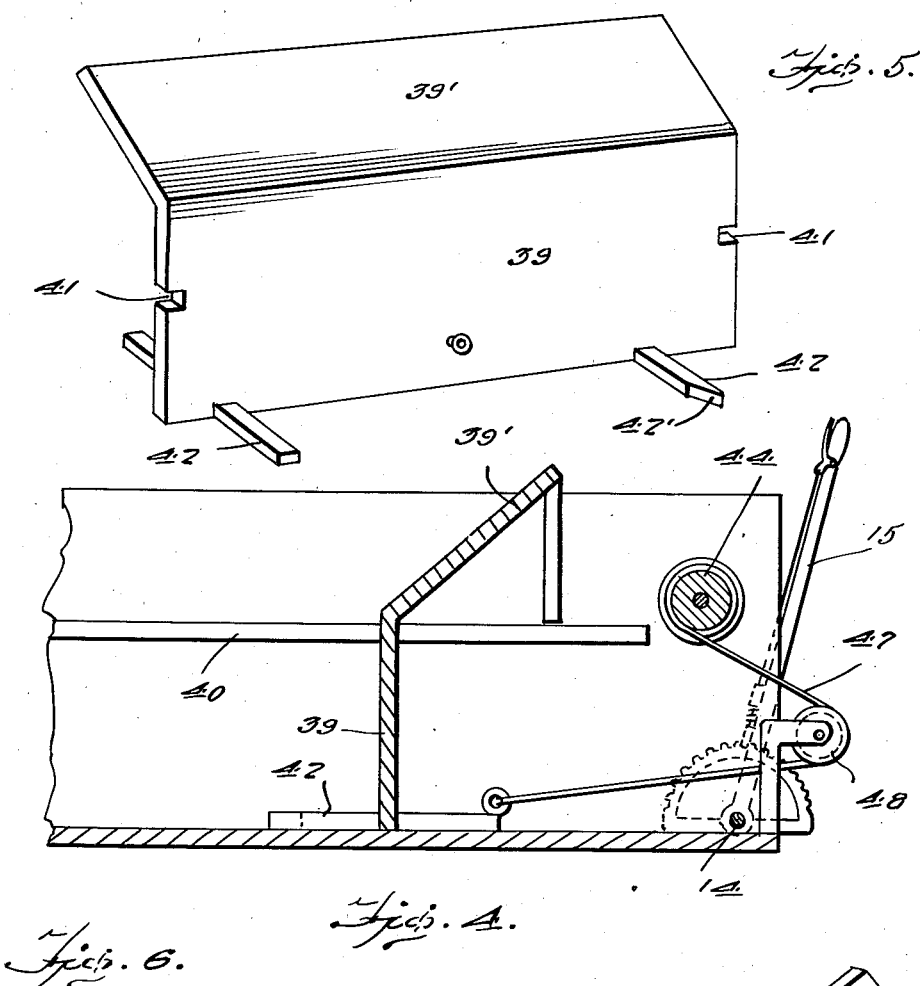
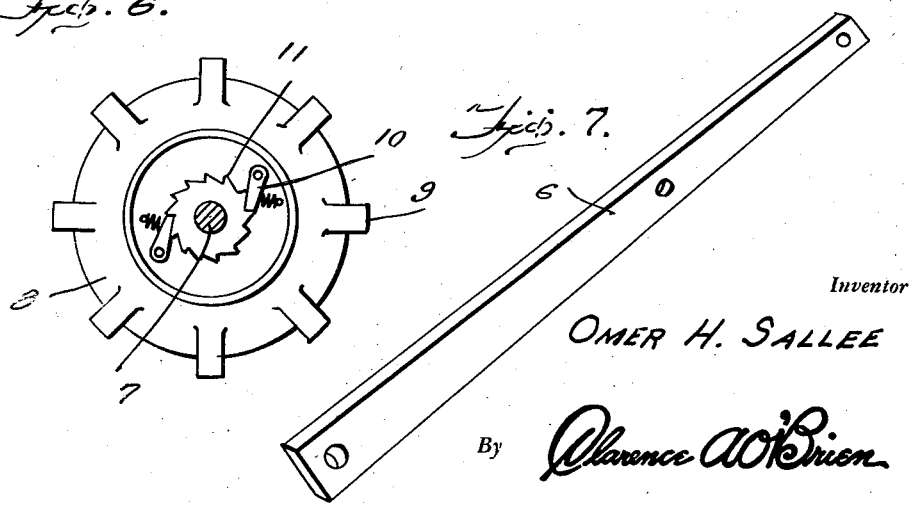
Inventor
OMER H. SALLEE
By Clarence A. O'Brien
Attorney Patented Dec. 1, 1942

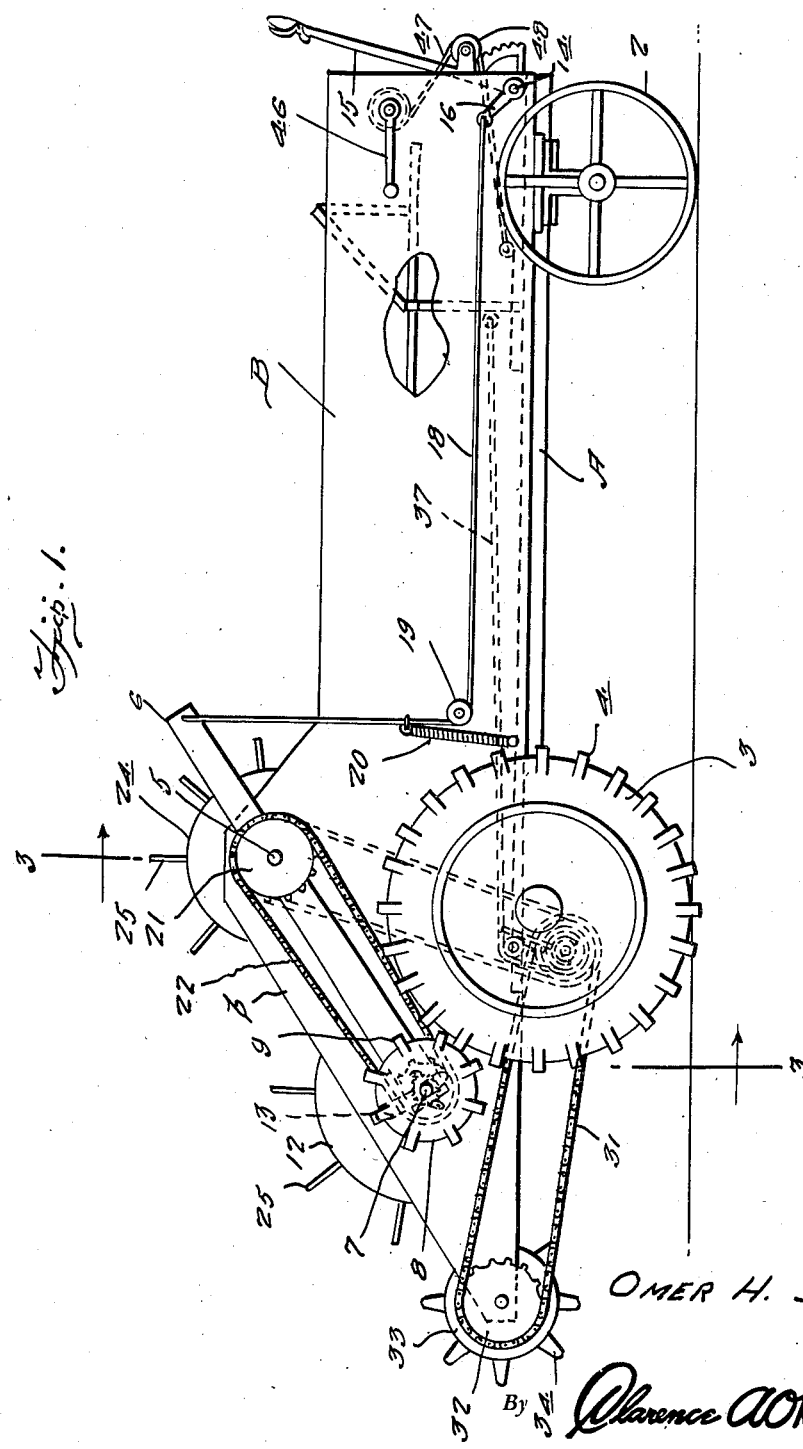

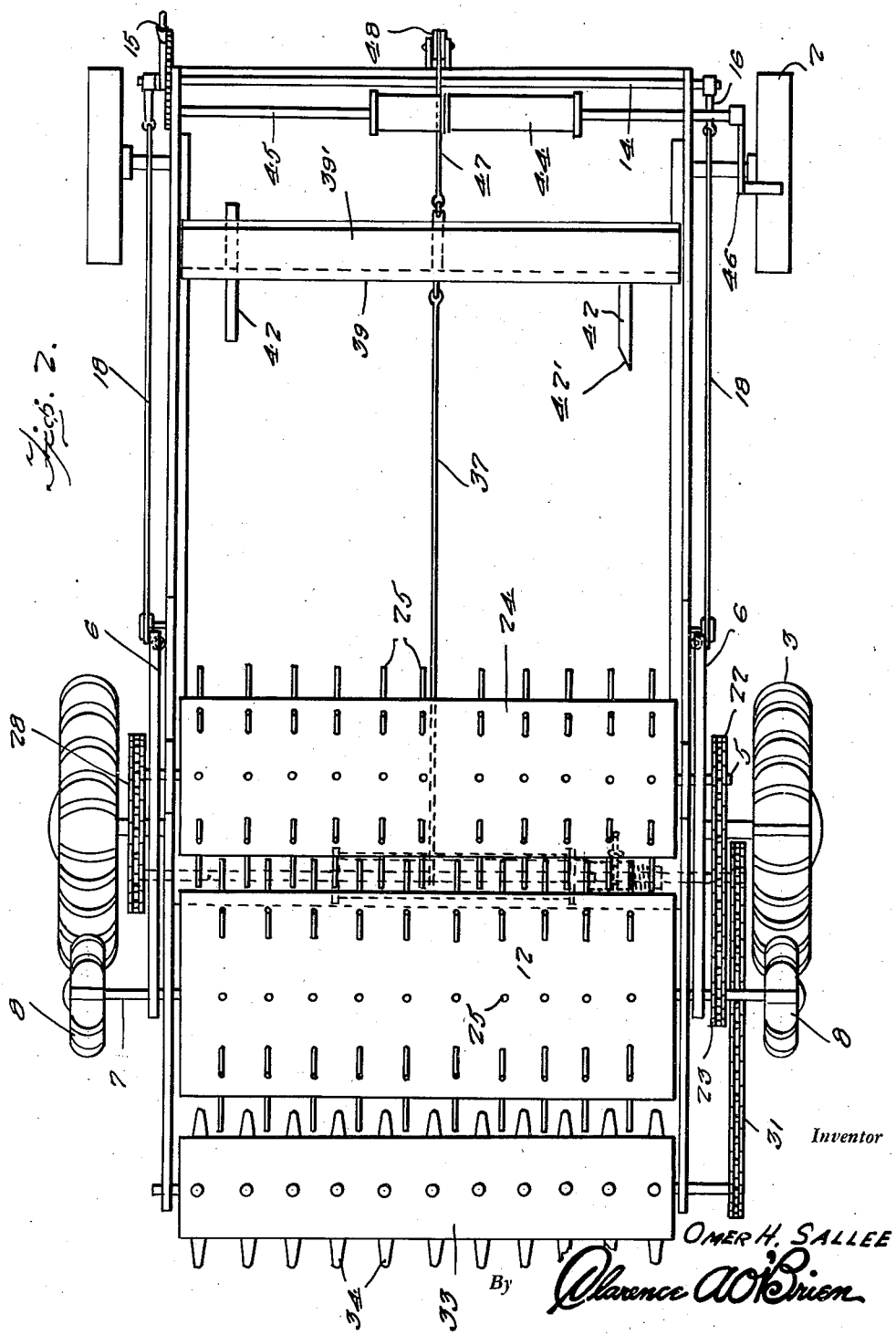

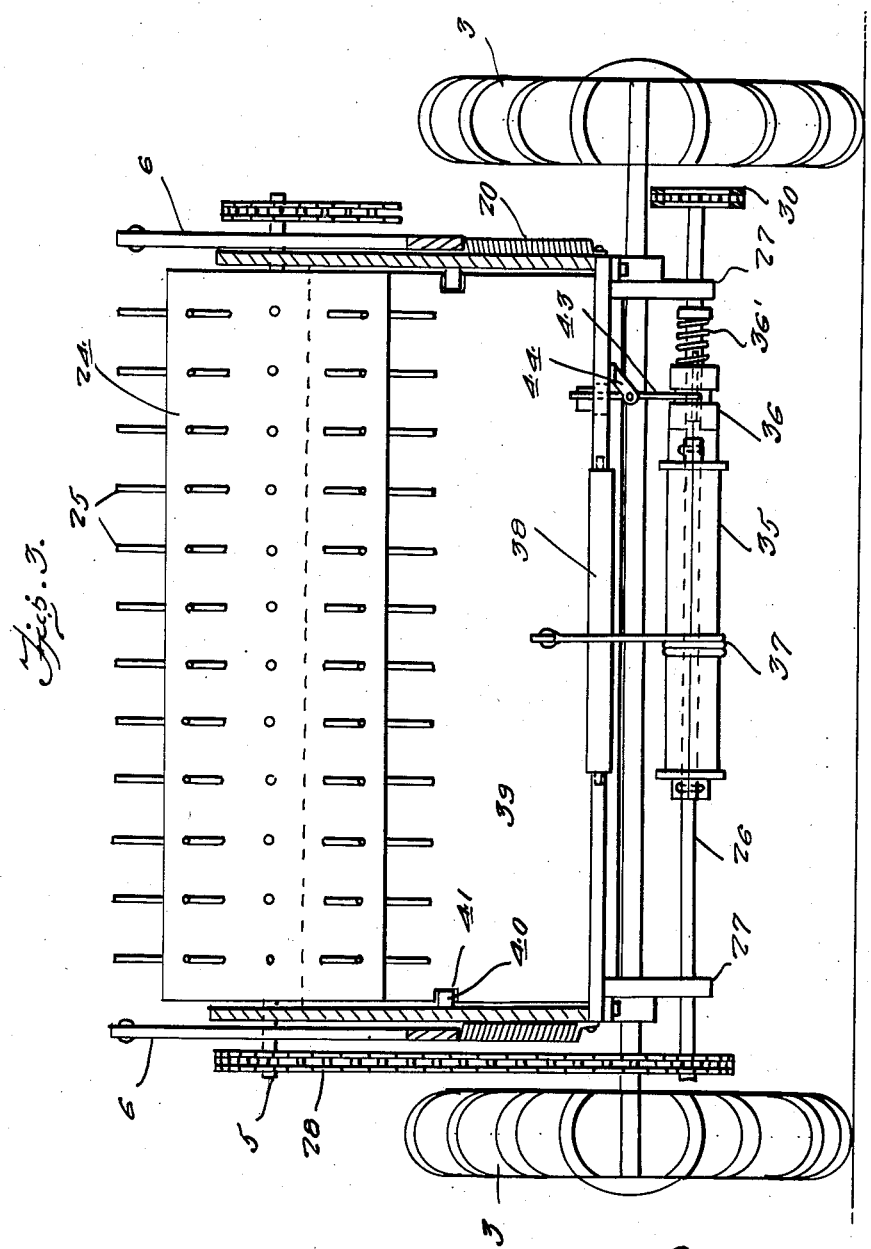

2,303,583

UNITED STATES PATENT OFFICE 2,303,583

SPREADER APPARATUS

Omer H. Sallee, Willow Creek, Mont.

Application April 2, 1941, Serial No. 386,518

3 Claims. (Cl. 275—4)

This invention relates to a spreader apparatus for spreading manure and other material, the general object of the invention being to provide means whereby the spreader rollers are driven from the ground wheels of a wagon or trailer, with a follower automatically operated to force the contents of the body of the spreader toward the rear of the body where the material will be engaged by the spreader rollers and means for automatically stopping the spreading means when the follower approaches the same so that said follower will not be engaged by the spreading rollers.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is an elevational view of the invention.

Figure 2 is a top plan view thereof.

Figure 3 is a section on the line 3—3 of Figure 1.

Figure 4 is a longitudinal sectional view through the central portion of the body showing the follower means therein.

Figure 5 is a view of the follower.

Figure 6 is a view looking toward the inner face of one of the small wheels which engage the large wheels of the wagon.

Figure 7 is a view of one of the bars for carrying the small wheels.

In these views the letter A indicates the wagon gear which includes the front wheels 2 and the rear wheels 3, these wheels 3 having the lugs 4 thereon, preferably formed on pneumatic tires. A body B is carried by the gear and has an enlarged rear portion *b* which extends upwardly and tapers rearwardly well beyond the rear wheels 3. A transverse shaft 5 extends across the body and in the upper portion of the enlarged part thereof and bars 6, see Figure 7, are pivotally connected with the ends of the shaft 5, these bars being arranged outwardly of the body. A shaft 7 has its ends journaled in the lower ends of the bars 6 and small wheels 8 having lugs 9 thereon are carried by the ends of the shaft 8 with the lugs 9 engaging the lugs 4 of the wheeels 3 when the parts are in operative position as shown in Figure 1 so that the wheels 8 and the shaft 7 will be driven from the ground wheels 3. Each wheel 8 is fastened to the end of the shaft 7 by the spring dogs 10 engaging the ratchet wheel 11 so that when the vehicle is being turned the inside wheel can slip while the outside wheel 8 is being driven so that no damage will occur to the parts. A drum or roller 12 is carried by the shaft 7 and is located within the rear extension of the body, the sides of the body being formed with the slots 13 for permitting portions of the shaft 7 to pass through the sides of the body when the bars 6 are pulled downwardly at the front end to raise the wheels 8 out of engagement with the ground wheels 3. This is done by means of a cross shaft 14 journaled in the front of the body and rocked by a hand lever 15, the shaft being provided with the arms 16 to which cables 18 are connected which pass over the guide pulleys 19 and then upwardly and are connected with the front ends of the bars 6. Thus by manipulating the lever 15 the bars 6 can be pulled downwardly so that they will rock on the shaft 5 and the lower ends will move upwardly thus moving the wheels 8 out of contact with the ground wheels 3. This of course will render the spreading means inoperative. Springs 20 connect with the upwardly extending parts of the cables and portions of the body and facilitate the raising of the drum 12, the shaft 7 and the wheels 8. A sprocket 21 is connected to one end of the shaft 5 outwardly of the adjacent bar 6 and a chain 22 passes over the sprocket and over a sprocket 23 on the shaft 7 so that the shaft 5 is driven from the shaft 7 and a drum 24 is carried by the shaft 5 and, of course, rotates therewith. Each drum is formed with the spikes or pins 25 for engaging material to be spread.

A shaft 26 is journaled in the hangers 27 at the rear of the body and this shaft is driven from the shaft 5 by the chain and sprockets shown generally at 28. A sprocket 30 is connected to the other end of the shaft 26 and a chain 31 passing over the sprocket and over a sprocket 32 on the drum 33 which is journaled in the rear end of the enlarged part of the body, this drum having the fingers 34 radiating therefrom. This drum acts as an auxiliary spreader.

A small drum 35 is rotatably arranged on the shaft 26 and is connected with the shaft by a spring actuated clutch 36. A cable 37 is attached to the drum 35, and passes over a roll 38 and then passes forwardly where it is connected to a follower plate 39. This follower plate has its upper portion sloping forwardly and upwardly as shown at 39' so that this part will avoid the drum 24 and its fingers 25 as the body or lower part of the plate approaches closely the spreading means. The plate is guided for sliding movement by the rails 40 at the sides of the body engaging notches 41 in the ends of the plate and runners 42 are connected with the lower edge of the plate and engage the bottom of the body. One runner is formed with a pointed rear end 42' for engaging the upper end of a clutch shift lever 43 pivoted intermediate its ends to a bracket 44 depending from the body, this lever shifting the clutch 36 to releasing position and against the action of its spring 36' as the follower plate approaches the spreading drum. Thus the cable drum 35 is automatically released from the drive shaft 26 when the follower plate reaches the end of its rearward movement so that no harm or damage will result to the parts as it would if the follower plate was not stopped automatically. A cable drum 44 is carried by a shaft 45 in the front of the body and this shaft is adapted to be turned by a handle 46. A cable 47 passes over the drum 44 and around a pulley 48 and then the cable is attached to a front part of the follower plate so that by winding the cable 47 upon the drum 44 the follower plate can be moved back to its starting point at the front of the body before the body is filled with the material to be spread.

Thus it will be seen that as the vehicle travels along the small wheels 8 will be rotated by the ground wheels 3 so that the drum 12 is rotated and the drum 24 is also rotated through means of the sprocket and chain arrangement from the shaft 7 to the shaft 5. The auxiliary spreader drum 33 will also be rotated from the shaft 26 driven from the shaft 5. Thus the material will be taken from the body and thrown upon the ground in rear of the body, the material in the body being fed into the drums or rolls by the follower plate which is automatically moved toward the spreading means by the cable 37 on the drum 35. Then when the follower plate nears the spreading means it is automatically stopped by the point 42' of the runner 43 engaging the clutch lever 42 which releases the clutch 36 so that the drum 35 comes to rest. Then the operator can by pulling upon the lever 15 raise the bars 6 to move the small wheels 8 out of engagement with the ground wheels 3 so that further movement of the feeding means or spreading means will cease. Then the drum 44 is turned by the handle 46 to move back the follower plate so that the body can be again filled with material to be spread. I prefer to make the body removable from the gear so that this gear can be used with other types of bodies.

The drum 35 is formed in two sections which are suitably connected together and held on the shaft so that this drum can be removed and either smaller or larger drum substituted for it, thus providing means for regulating the speed of the follower plate.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In a vehicle including a body having upright sides and a closed bottom, spreader means at the rear of the body, manually controlled means for actuating the spreader means, a shaft rotatably supported under the rear portion of the body at the rear thereof, means for rotating the shaft from the spreader means, a drum on the shaft, clutch means for connecting the drum with the shaft, a laterally movable lever supported from the body for moving the clutch means to releasing position, a follower plate extending transversely across the body, runners connected with the lower edge of the plate and sliding on the closed bottom, a cable on the drum and connected with the rear face of the follower plate, one of the runners having its rear end shaped to engage the clutch lever and move the same to release the clutch means when the follower plate approaches the spreading means, a manually operated drum in the front of the body, a cable carried by the same and connected with the follower plate for moving the plate to the front end of the body.

2. In a vehicle including a body having upright sides and a closed bottom, spreader means at the rear of the body, manually controlled means for actuating the spreader means, a shaft rotatably supported under the rear portion of the body at the rear thereof, means for rotating the shaft from the spreader means, a drum on the shaft, clutch means for connecting the drum with the shaft, a lever supported from the body for moving the clutch means to releasing position, a follower plate extending transversely across the body, runners connected with the lower edge of the plate and sliding on the closed bottom, a cable on the drum and connected with the rear face of the follower plate, one of the runners having its rear end shaped to engage the clutch lever and move the same to release the clutch means when the follower plate approaches the spreading means, a manually operated drum in the front of the body, a cable carried by the same and connected with the follower plate for moving the plate to the front end of the body, longitudinally extending guide bars on the inner faces of the side members of the body and the ends of the follower plate having notches therein through which the guide bars pass.

3. In a vehicle including ground wheels and a body, a transverse shaft passing through the body above the rear ground wheels, a spreader drum carried by the shaft, a pair of bars pivoted intermediate their ends to the ends of the shaft, said bars being located outside of the body, a shaft passing through the rear ends of the bars, small wheels connected with the ends of the last-mentioned shaft and engaging the rear wheels of the vehicle, means for transmitting the motion of the small wheels to the first-mentioned shaft, cables connected to the front ends of the bars, a manually operated shaft journaled in the front end of the body, arms connected with the ends of the manually operated shaft and to which arms the front ends of the cables are connected.

OMER H. SALLEE.